US011102836B2

(12) United States Patent
Pan et al.

(10) Patent No.: US 11,102,836 B2
(45) Date of Patent: Aug. 24, 2021

(54) METHOD AND APPARATUS FOR CONFIGURING SIDELINK COMMUNICATION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/894,351

(22) Filed: Jun. 5, 2020

(65) Prior Publication Data

US 2020/0413467 A1 Dec. 31, 2020

Related U.S. Application Data

(60) Provisional application No. 62/866,399, filed on Jun. 25, 2019.

(51) Int. Cl.
*H04W 76/18* (2018.01)
*H04W 76/27* (2018.01)
*H04W 72/04* (2009.01)

(52) U.S. Cl.
CPC ........... *H04W 76/18* (2018.02); *H04W 72/04* (2013.01); *H04W 76/27* (2018.02)

(58) Field of Classification Search
None
See application file for complete search history.

(56) References Cited

U.S. PATENT DOCUMENTS

| 9,730,060 | B2 | 8/2017 | Johansson et al. | |
| 2013/0324114 | A1* | 12/2013 | Raghothaman | H04W 36/03 455/426.1 |
| 2016/0309529 | A1 | 10/2016 | Li | |
| 2017/0303322 | A1* | 10/2017 | Watfa | H04W 8/005 |
| 2020/0245394 | A1* | 7/2020 | Wu | H04W 28/0268 |
| 2020/0260512 | A1* | 8/2020 | Cheng | H04W 4/70 |
| 2020/0351975 | A1* | 11/2020 | Tseng | H04W 76/27 |

OTHER PUBLICATIONS

LG Electronics, "Discussion on PC5 radio link status based mode 1 resource allocation for NR V2X", 3GPP TSG-RAN WG2 Meeting #106, R2-1907711 Reno, USA, May 13-May 17, 2019.

(Continued)

*Primary Examiner* — Alex Skripnikov
(74) *Attorney, Agent, or Firm* — Skaar Ulbrich Macari, P.A.

(57) ABSTRACT

A method and apparatus are disclosed from the perspective of a first UE (User Equipment) in RRC_CONNECTED to detect configuration failure. In one embodiment, the method includes the first UE transmitting a first PC5 RRC (Radio Resource Control) message to a second UE, wherein the first PC5 RRC message includes an AS (Access Stratum)-layer configuration for a unicast link established with the second UE. The method also includes the first UE transmitting a fourth RRC message to a network node if a configuration failure of the AS-layer configuration is detected, wherein the fourth RRC message indicates the configuration failure occurs.

16 Claims, 18 Drawing Sheets

(56) References Cited

OTHER PUBLICATIONS

OPPO (rapporteur), "Summary of [105bis#32] PC5-RRC signalling", 3GPP TSG-RAN WG2 Meeting #106 R2-1905585 Reno, US, May 13-May 17, 2019.
ITL, "PC5 RRC connection establishment for unicast", 3GPP TSG-RAN WG2 Meeting #105 R2-190xxxx Athens, Greece, Mar. 1-25, 2019.
OPPO, "TP for PC5-RRC based procedure for unicast in NR-V2X", 3GPP TSG-RAN WG2 Meeting #105 R2-19000181 Athens, Greece, Feb. 25-Mar. 1, 2019.
SA WG2 Meeting #S2-132 S2-1902957 Apr. 8-12, 2019, Xi'an, China (revision of S2-1902790) Title: LS response to SA2 on unicast, groupcast and broadcast in NR sidelink.
SA WG2 Meeting S2#134 S2-1906845 Jun. 24-28, 2019, Sapporo, Japan.
European Search Report in corresponding EP Application No. 20178404.8, dated Oct. 15, 2020.
OPPO: "Discussion on PC5-RRC for unicast", 3GPP Draft; R2-1903211-Discussion on PC5-RRC for Unicast, 3rd Generation Partnership Project (3GPP), Mobile Competence Centre; 650, Route Des Lucioles; F-06921 Sophia-Antipolis Cedex; France, Apr. 6, 2019, XP051700563.
OPPO: "Discussion on network involvement in unicast link establishment", 3GPP Draft; R2-1905580-Discussion on Network Involvement in Unicast Link Establishment, 3rd Generation Partnership Project (3GPP), Mobile Competence Centre; 650, Route Des Lucioles; F06921 Sophia, May 13, 2019, XP051729084.
Samsung: "Discussion on SL AS-layer Configuration Failure", 3GPP Draft; R2-1907968, 3rd Generation Partnership Project (3GPP), Mobile Competence Centre; 650, Route Des Lucioles; F-06921 Sophia-Antipolis Cedex; France, May 13, 2019, XP051731375.
Office Action to the counterpart Taiwan Patent Application rendered by the Taiwan Intellectual Property Office (TIPO) dated Feb. 25, 2021, 8 pages.
3GPP TSG-RAN WG2 Meeting #105bis R2-1903211 Xi' an, China, Apr. 8-12, 2019, 9 pages.
3GPP TS 36.331 V15.5.1; Technical Specification Group Radio Access Network; Evolved Universal Terrestrial Radio Access (E-UTRA); Radio Resource Control (RRC); Protocol specification (Release 15) Apr. 22, 2019, 944 pages.
Office Action to the counterpart Japanese Patent Application rendered by the Japan Patent Office (JPO) dated May 11, 2021, 7 pages (including English translation).
ASUSTeK, Discussion on UE assistance information for SLRB configuration [online], 3GPP TSG RAN WG2 #106 R2-1906545, May 13, 2019, Internet <URL: https://www.3gpp.org/ftp/tsg_ran/WG2_RL2/TSGR2_106/Docs/R2-1906545.zip>, 5 pages.
LG Electronics Inc., Protection of PC5-RRC Messages [online], 3GPP TSG RAN WG2 #105bis R2-1905052, Apr. 8, 2019, Internet URL:https://www.3gpp.org/ftp/tsg_ran/WG2_RL2/TSGR2_105bis/Docs/R2-1905052.zip>, 2 pages.

* cited by examiner

US 11,102,836 B2

METHOD AND APPARATUS FOR CONFIGURING SIDELINK COMMUNICATION IN A WIRELESS COMMUNICATION SYSTEM

CROSS-REFERENCE TO RELATED APPLICATIONS

The present application claims the benefit of U.S. Provisional Patent Application Ser. No. 62/866,399 filed on Jun. 25, 2019, the entire disclosure of which is incorporated herein in its entirety by reference.

FIELD

This disclosure generally relates to wireless communication networks, and more particularly, to a method and apparatus for configuring sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) in RRC_CONNECTED to detect configuration failure. In one embodiment, the method includes the first UE transmitting a first PC5 RRC (Radio Resource Control) message to a second UE, wherein the first PC5 RRC message includes an AS (Access Stratum)-layer configuration for a unicast link established with the second UE. The method also includes the first UE transmitting a fourth RRC message to a network node if a configuration failure of the AS-layer configuration is detected, wherein the fourth RRC message indicates the configuration failure occurs.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 V15.3.0, "E-UTRA and E-UTRAN Overall Description; Stage 2 (Release 15)"; TS 38.331 V15.4.0, "NR; Radio Resource Control (RRC) protocol specification (Release 15)"; TR 38.885 V16.0.0, "NR; Study on NR Vehicle-to-Everything (V2X) (Release 16)"; TS 23.287 V0.4.0, "Architecture enhancements for 5G System (5GS) to support Vehicle-to-Everything (V2X) services (Release 16)"; 3GPP RAN2 #106 Chairman's note; and TS 36.331 V15.3.0, "E-UTRA; Radio Resource Control (RRC) Protocol specification (Release 15)". The standards and documents listed above are hereby expressly incorporated by reference in their entirety.

Figure 1:
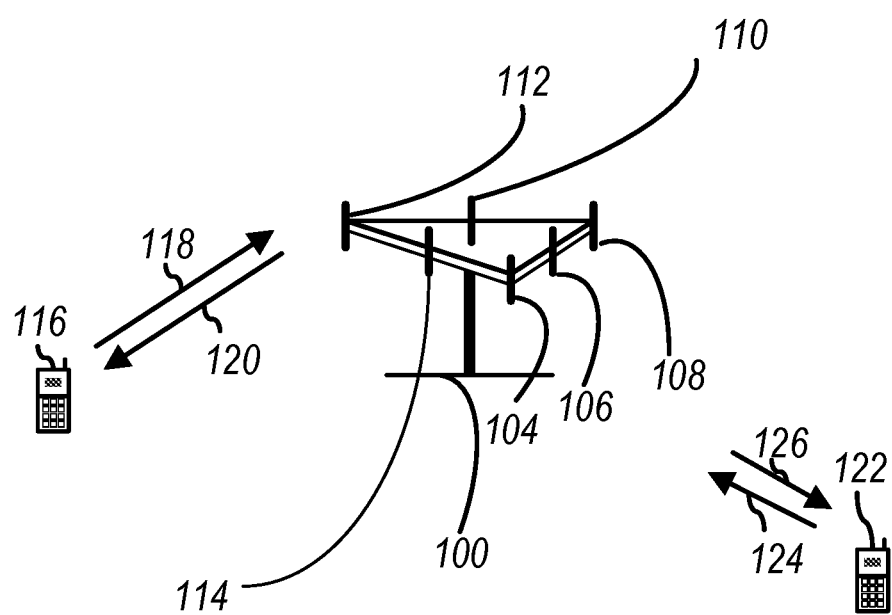
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
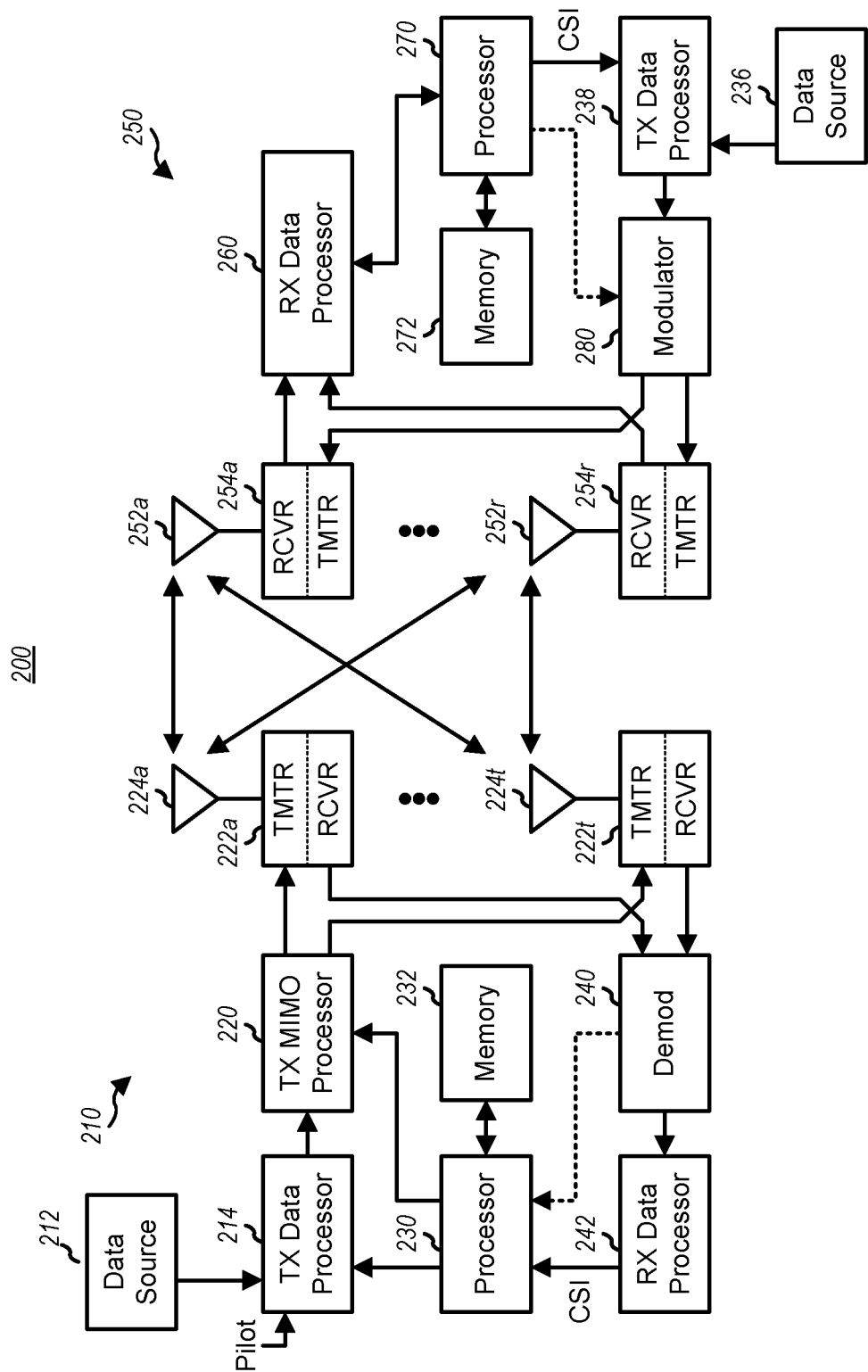
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
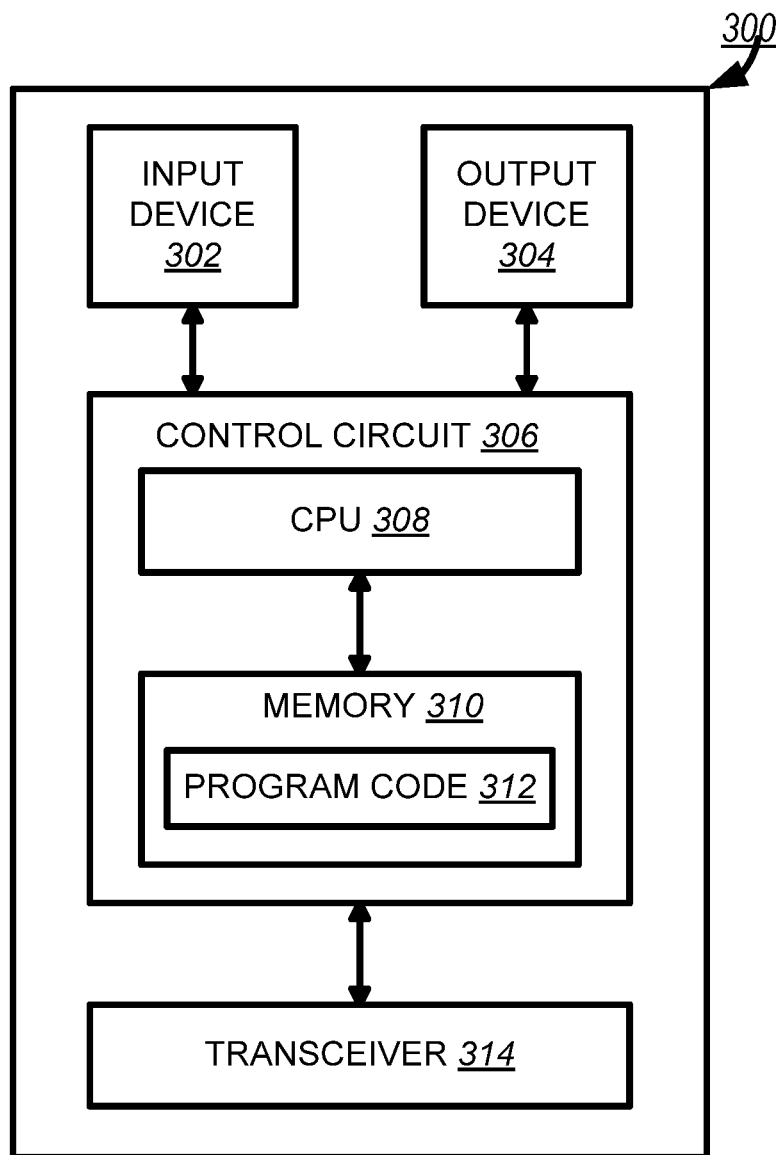
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
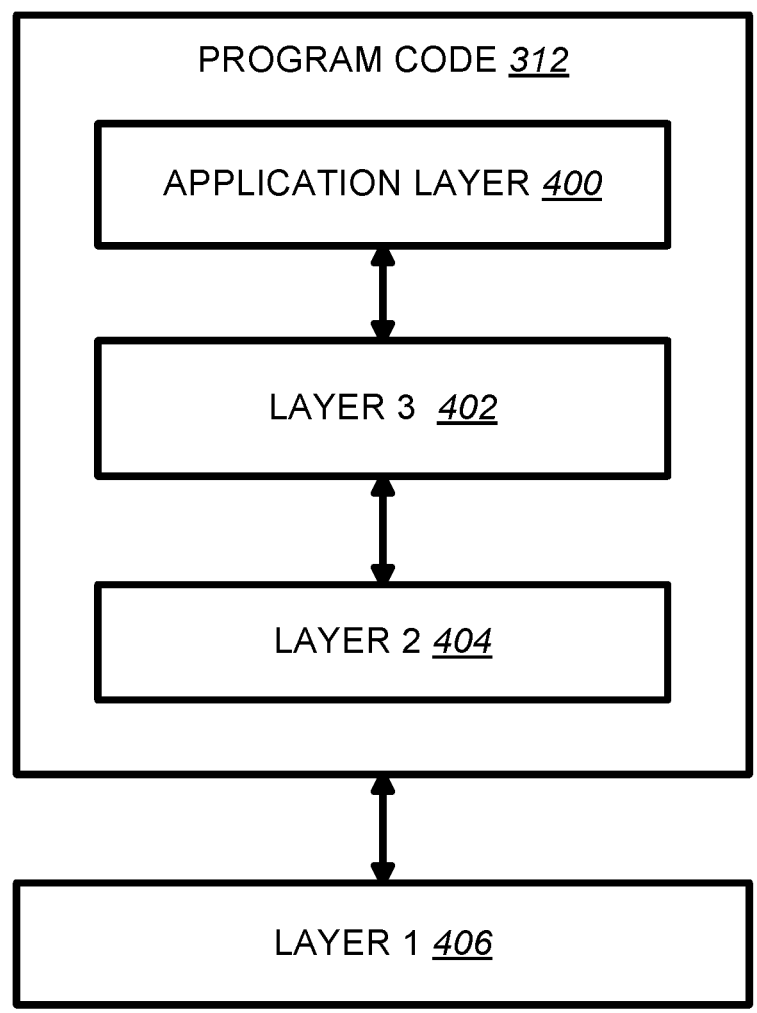
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.300 introduces the mapping between sidelink radio bearers and sidelink logical channels as follows:
6 Layer 2

Layer 2 is split into the following sublayers: Medium Access Control (MAC), Radio Link Control (RLC) and Packet Data Convergence Protocol (PDCP).

This subclause gives a high level description of the Layer 2 sub-layers in terms of services and functions. The three figures below depict the PDCP/RLC/MAC architecture for downlink, uplink and Sidelink, where:

Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.

Figure 5:
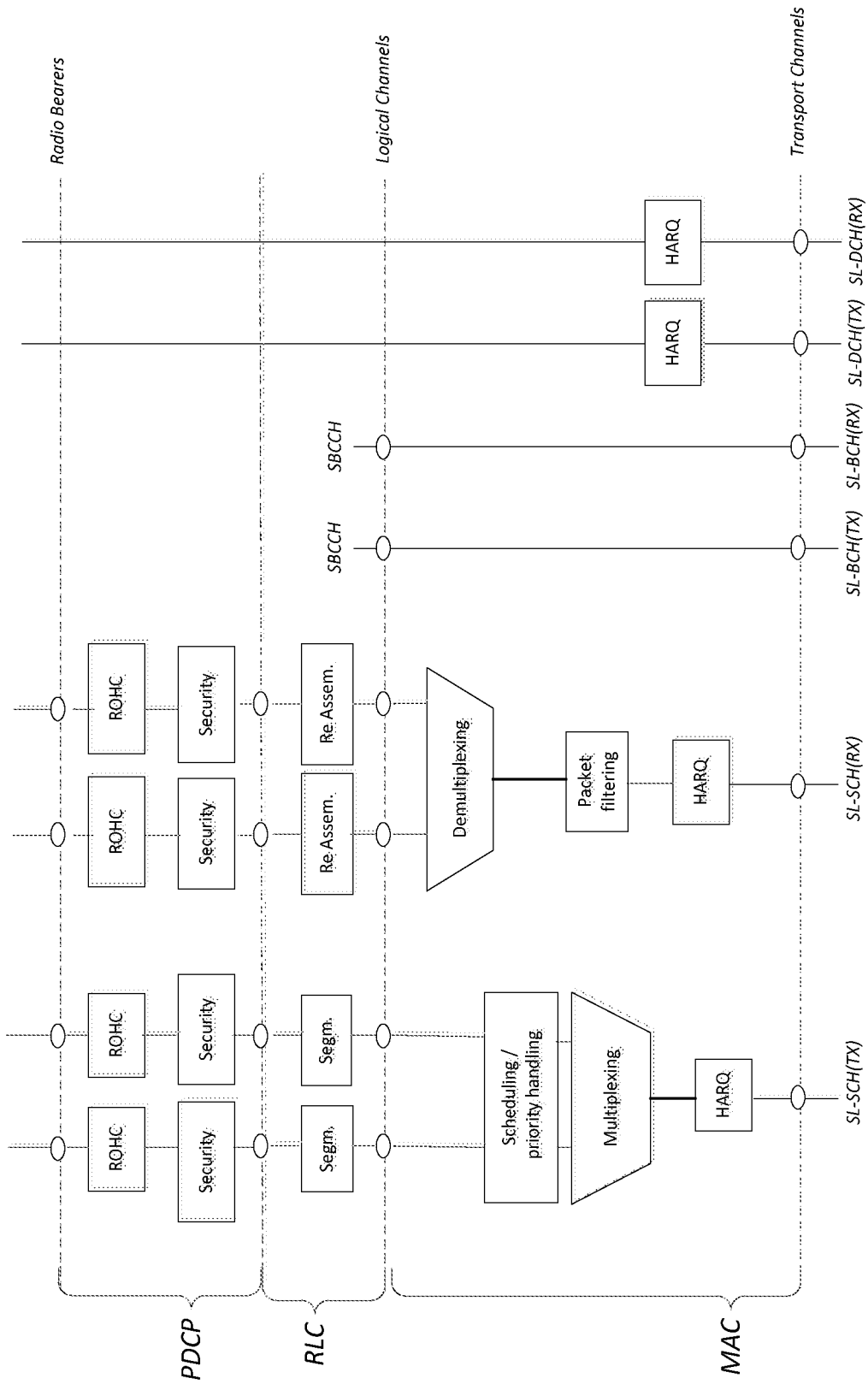
FIG. 5 is a reproduction of FIG. 6-3 of 3GPP TS 36.300 V15.3.0.
Figure 6:
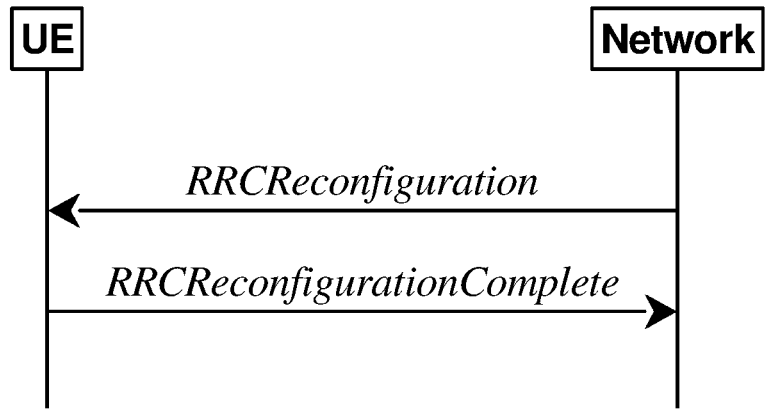
FIG. 6 is a reproduction of FIG. 5.3.5.1-1 of 3GPP TS 38.331 V15.4.0.

The multiplexing of several logical channels (i.e. radio bearers) on the same transport channel (i.e. transport block) is performed by the MAC sublayer;

In both uplink and downlink, when neither CA nor DC are configured, only one transport block is generated per TTI in the absence of spatial multiplexing;

In Sidelink, only one transport block is generated per TTI.
[FIG. 6-3 of 3GPP TS 36.300 V15.3.0, entitled "Layer 2 Structure for Sidelink", is reproduced as FIG. 5]

Figure 7:
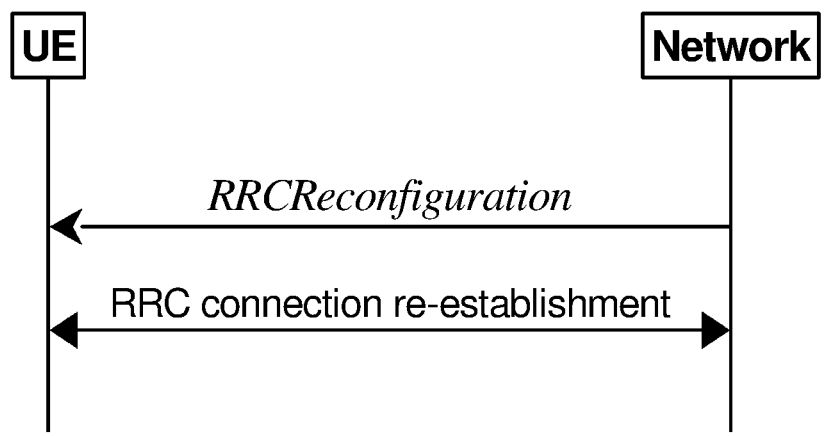
FIG. 7 is a reproduction of FIG. 5.3.5.1-2 of 3GPP TS 38.331 V15.4.0.

3GPP TS 38.331 states:
5.3.5 RRC Reconfiguration
5.3.5.1 General
[FIG. 5.3.5.1-1 of 3GPP TS 38.331 V15.4.0, entitled "RRC reconfiguration, successful", is reproduced as FIG. 6]
[FIG. 5.3.5.1-2 of 3GPP TS 38.331 V15.4.0, entitled "RRC reconfiguration, failure", is reproduced as FIG. 7]

The purpose of this procedure is to modify an RRC connection, e.g. to establish/modify/release RBs, to perform reconfiguration with sync, to setup/modify/release measurements, to add/modify/release SCells and cell groups. As part of the procedure, NAS dedicated information may be transferred from the Network to the UE.

In EN-DC, SRB3 can be used for measurement configuration and reporting, to (re-)configure MAC, RLC, physical layer and RLF timers and constants of the SCG configuration, and to reconfigure PDCP for DRBs associated with the S-K$_{gNB}$ or SRB3, provided that the (re-) configuration does not require any MeNB involvement.

5.3.5.8.2 Inability to Comply with RRCReconfiguration

The UE shall:
1> if the UE is operating in EN-DC:
  2> if the UE is unable to comply with (part of) the configuration included in the RRCReconfiguration message received over SRB3;
    3> continue using the configuration used prior to the reception of RRCReconfiguration message;
    3> initiate the SCG failure information procedure as specified in subclause 5.7.3 to report SCG reconfiguration error, upon which the connection reconfiguration procedure ends;
  2> else, if the UE is unable to comply with (part of) the configuration included in the RRCReconfiguration message received over SRB1;
    3> continue using the configuration used prior to the reception of RRCReconfiguration message;
    3> initiate the connection re-establishment procedure as specified in TS 36.331 [10], clause 5.3.7, upon which the connection reconfiguration procedure ends.
1> else if RRCReconfiguration is received via NR:
  2> if the UE is unable to comply with (part of) the configuration included in the RRCReconfiguration message;
    3> continue using the configuration used prior to the reception of RRCReconfiguration message;
    3> if security has not been activated:
      4> perform the actions upon going to RRC_IDLE as specified in 5.3.11, with release cause 'other'
    3> else if AS security has been activated but SRB2 and at least one DRB have not been setup:
      4> perform the actions upon going to RRC_IDLE as specified in 5.3.11, with release cause 'RRC connection failure';
    3> else:
      4> initiate the connection re-establishment procedure as specified in 5.3.7, upon which the reconfiguration procedure ends;
1> else if RRCReconfiguration is received via other RAT (Handover to NR failure):
  2> if the UE is unable to comply with any part of the configuration included in the RRCReconfiguration message:
    3> perform the actions defined for this failure case as defined in the specifications applicable for the other RAT.

NOTE 1: The UE may apply above failure handling also in case the RRCReconfiguration message causes a protocol error for which the generic error handling as defined in 10 specifies that the UE shall ignore the message.

NOTE 2: If the UE is unable to comply with part of the configuration, it does not apply any part of the configuration, i.e. there is no partial success/failure.

Figure 8:
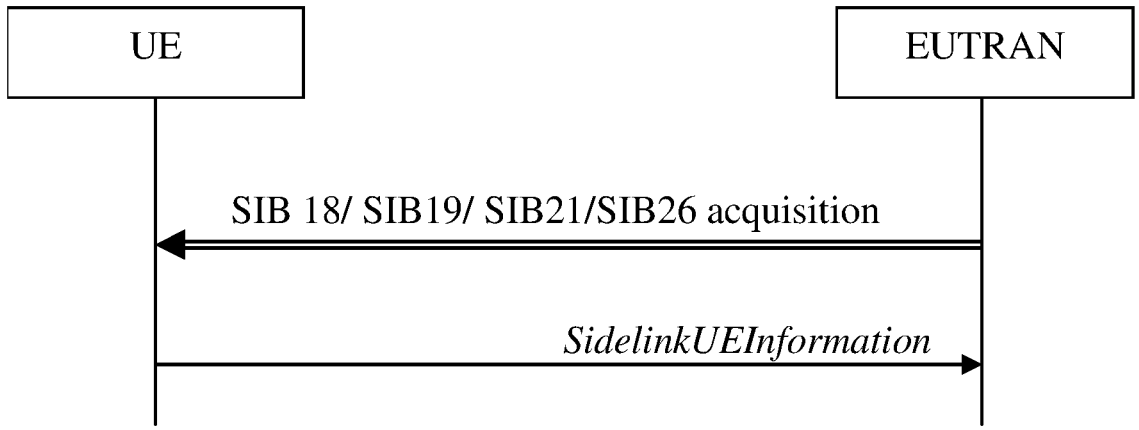
FIG. 8 is a reproduction of FIG. 5.10.2-1 of 3GPP TS 36.331 V15.3.0.

3GPP TS 36.331 states:
5.10.2 Sidelink UE Information
5.10.2.1 General
[FIG. 5.10.2-1 of 3GPP TS 36.331 V15.3.0, entitled "Sidelink UE information", is reproduced as FIG. 8]

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon or SystemInformationBlockType26 does not include the resources for transmission (in normal conditions), initiates connection establishment in accordance with 5.3.3.1a.

3GPP TR 38.885 states:

5.4.4 RRC

RRC is used to exchange at least UE capabilities and AS layer configurations. For UE capability transfer, the information flow is triggered during or after PC5-S signalling for direct link setup, and can be done in a one-way manner, e.g. as shown in FIG. 5.4.4-1, or a two-way manner, e.g. as shown in FIG. 5.4.4-2.

Figure 9:
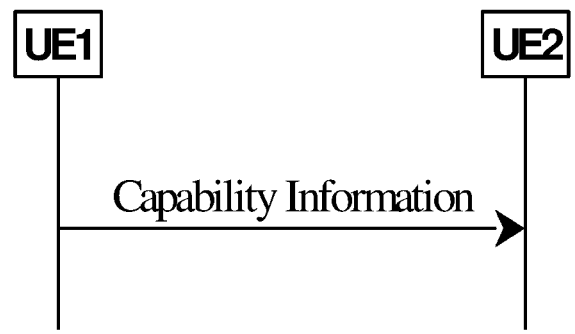
FIG. 9 is a reproduction of FIG. 5.4.4-1 of 3GPP TR 38.885 V16.0.0.

[FIG. 5.4.4-1 of 3GPP TR 38.885 V16.0.0, entitled "One-way information flow for UE capability transfer", is reproduced as FIG. 9]

Figure 10:
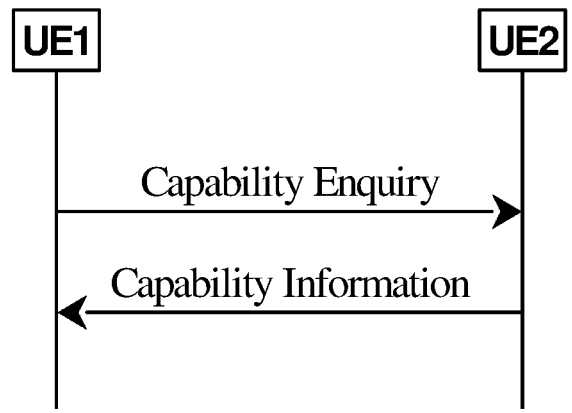
FIG. 10 is a reproduction of FIG. 5.4.4-2 of 3GPP TR 38.885 V16.0.0.

[FIG. 5.4.4-2 of 3GPP TR 38.885 V16.0.0, entitled "Two-way information flow for UE capability transfer", is reproduced as FIG. 10]

For AS layer configuration, the information flow is triggered during or after PC5-S signalling for direct link setup, and can be done in the two-way manner, e.g. as shown in FIG. 5.4.4-3.

Figure 11:
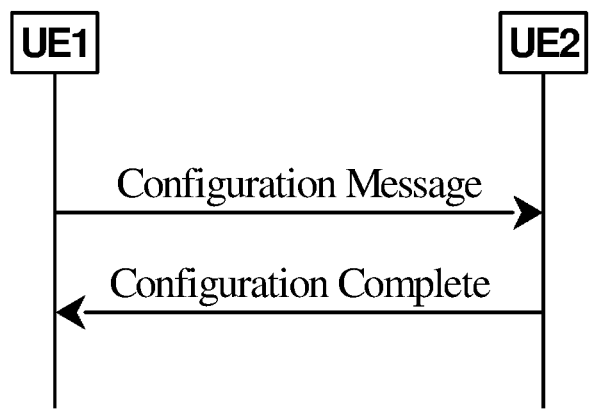
FIG. 11 is a reproduction of FIG. 5.4.4-3 of 3GPP TR 38.885 V16.0.0.

[FIG. 5.4.4-3 of 3GPP TR 38.885 V16.0.0, entitled "SL AS layer configuration information flow", is reproduced as FIG. 11]

There is no need for one-to-many PC5-RRC connection establishment among group members for groupcast.

7 QoS Management

QoS management is relevant to V2X in the context of its use in resource allocation, congestion control, in-device coexistence, power control and SLRB configuration. Physical layer parameters related to QoS management are the priority, latency, reliability and minimum required communication range (as defined by higher layers) of the traffic being delivered. Data rate requirements are also supported in the AS. A SL congestion metric and, at least in resource allocation mode 2, mechanisms for congestion control are needed. It is beneficial to report the SL congestion metric to gNB.

For SL unicast, groupcast and broadcast, QoS parameters of V2X packets are provided by upper layers to the AS. For SL unicast, the SLRBs are (pre-)configured based on the signalling flows and procedures shown in FIGS. 7-1 and 7-2. The per-flow QoS model described in [6] is assumed in upper layers.

Figure 12:
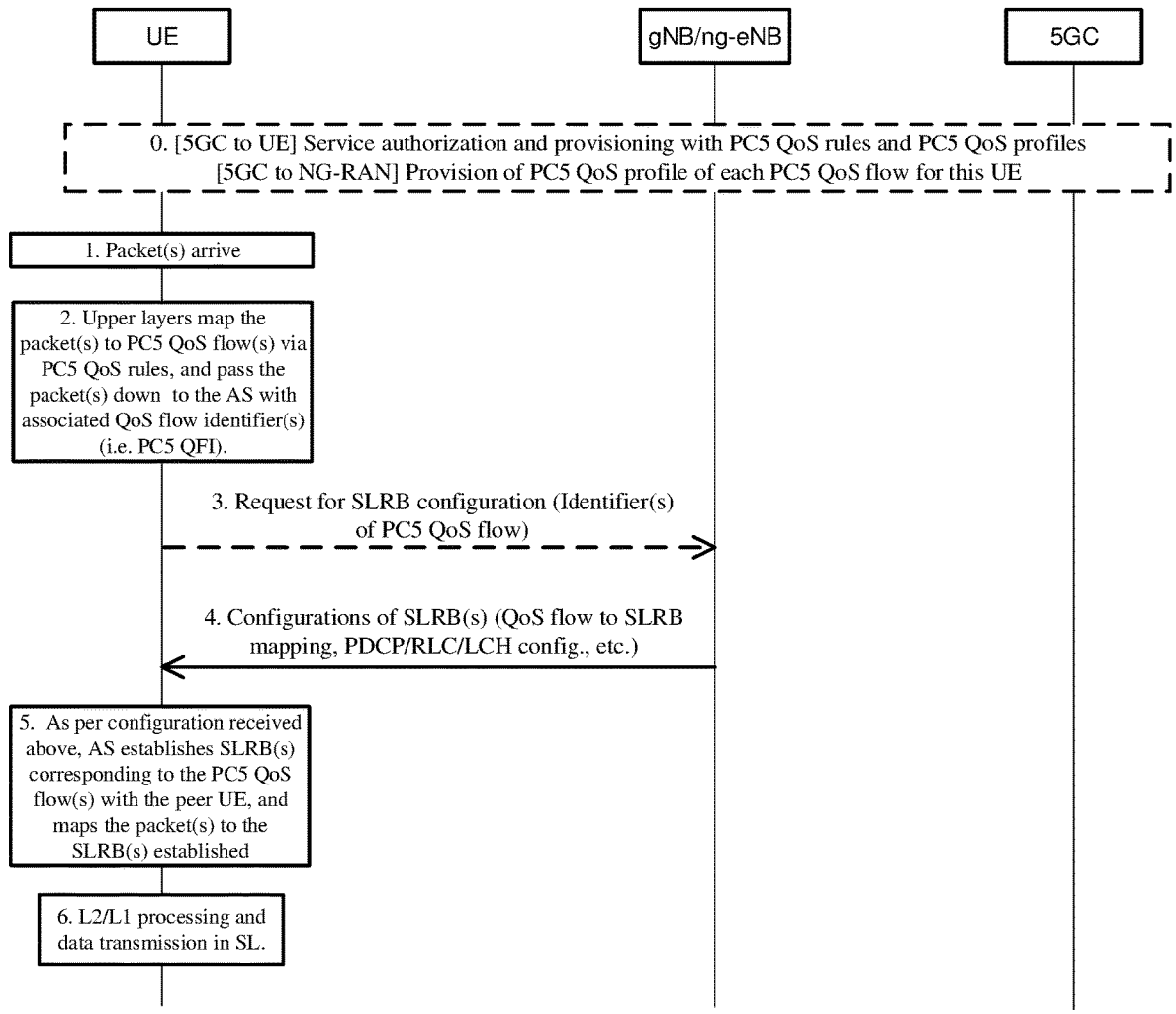
FIG. 12 is a reproduction of FIG. 7-1 of 3GPP TR 38.885 V16.0.0.

[FIG. 7-1 of 3GPP TR 38.885 V16.0.0, entitled "SLRB configuration for SL unicast (UE-specific)", is reproduced as FIG. 12]

In Step 0 of FIG. 7-1, the PC5 QoS profile, i.e. a set of specific PC5 QoS parameters, and PC5 QoS rule for each PC5 QoS flow are provisioned to the UE in advance by service authorization and provisioning procedures as in [6]; similarly, PC5 QoS profile for each QoS flow is also provisioned to the gNB/ng-eNB in advance. Then, when packet(s) arrive, the UE can first derive the identifier of the associated PC5 QoS flow(s) (i.e. PC5 QFI) based on the PC5 QoS rules configured in Step 0, and may then report the derived PC5 QFI(s) to the gNB/ng-eNB in Step 3. The gNB/ng-eNB can derive the QoS profile(s) of these reported PC5 QFI(s) based on the provisioning from 5GC in Step 0, and may signal the configurations of the SLRB(s) associated with the PC5 QFI(s) UE reported via RRC dedicated signalling in Step 4. These SLRB configurations may include PC5 QoS flow to SLRB mapping, SDAP/PDCP/RLC/LCH configurations, etc. In Step 5, the UE in the AS establishes SLRB(s) associated with the PC5 QFI(s) of the packet(s) with the peer UE as per gNB/ng-eNB configuration, and maps available packet(s) to the SLRB(s) established. SL unicast transmission can then occur.

NOTE: How the PC5 QFI is defined is up to SA2 WG2.

3GPP TS 23.287 states:

5.2.1.4 Unicast Mode Communication Over PC5 Reference Point

Unicast mode of communication is only supported over NR based PC5 reference point. FIG. 5.2.1.4-1 illustrates an example granularity of PC5 unicast link.

Figure 13:
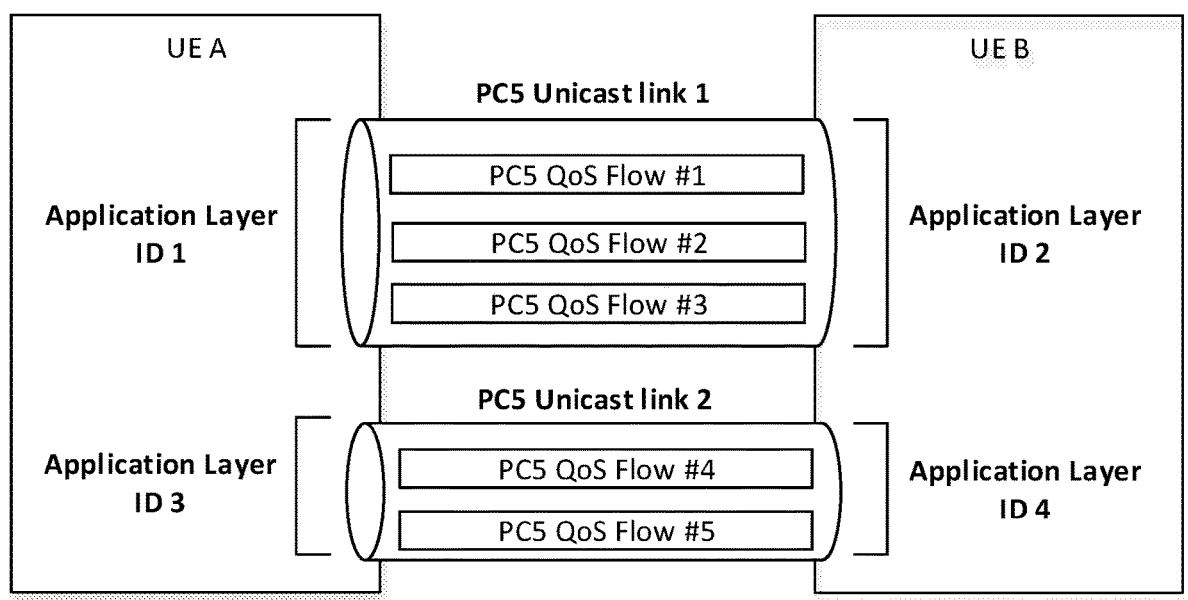
FIG. 13 is a reproduction of FIG. 5.2.1.4-1 of 3GPP TS 23.287 V0.4.0.

[FIG. 5.2.1.4-1 of 3GPP TS 23.287 V0.4.0, entitled "Granularity of PC5 Unicast Link", is reproduced as FIG. 13]

The following principles apply when the V2X communication is carried over PC5 unicast link:

The granularity of the PC5 unicast link is the same as the pair of Application Layer IDs for both UEs. Therefore, one PC5 unicast link supports one or more V2X services (e.g. PSIDs or ITS-AIDS) if the V2X services are associated with a same pair of Application Layer IDs. For example, as illustrated in FIG. 5.2.1.4-1, UE A has one PC5 unicast link with a peer UE which is identified by Application Layer ID 2 and another PC5 unicast link with a peer UE which is identified by Application Layer ID 4.

NOTE: From UE A's point of view, UE A may not know that Application Layer IDs provided by a peer UE belong to the same UE. In that case UE A doesn't have to know that multiple PC5 Unicast links are associated to the same peer UE.

The UE may determine to establish a separate PC5 unicast link e.g. depending on network layer protocols (e.g. IP or non-IP).

One PC5 unicast link supports one or more PC5 QoS Flows for the same or different V2X services.

Different PC5 QoS Flows may be selected for different V2X packets as specified in clause 5.4.1.1.1.

When Application layer initiates a V2X service which requires PC5 unicast communication, the UE establishes a PC5 unicast link with the corresponding UE as specified in clause 6.3.3.1.

After successful PC5 unicast link establishment, UE A and UE B use a same pair of Layer-2 IDs for subsequent PC5-S signalling message exchange and V2X service data transmission as specified in clause 5.6.1.4. V2X layer of the transmitting UE indicates to AS layer whether the message is for PC5-S signalling message (i.e. Direct Communication Request/Accept, Link Identifier Update Request/Response, Disconnect Request/Response) or service data transmission when it sends message over the established PC5 link. V2X layer of receiving UE handles message if it is PC5-S signalling message whilst the V2X layer of receiving UE forwards the message to the upper layer if it is application data message.

The unicast mode supports per-flow QoS model as specified in clause 5.4.1.4. During the unicast link establishment, each UEs self-assign PC5 Link Identifier and associate the PC5 Link Identifier with the Unicast Link Profile for the established unicast link. The PC5 Link Identifier is a unique value within the UE. The Unicast Link Profile identified by PC5 Link Identifier includes service type(s) (e.g. PSID or ITS-AID), Application Layer ID and Layer-2 ID of UE A, Application Layer ID and Layer-2 ID of UE B and a set of PC5 QoS Flow Identifier(s) (PFI(s)). Each PFI is associated with QoS parameters (i.e. PQI and optionally Range). The PC5 Link Identifier and PFI(s) are unchanged values for the established unicast link regardless of the change of Application Layer ID and Layer-2 ID. The UE uses PFI to indicate the PC5 QoS flow to AS layer, therefore AS layer identifies the corresponding PC5 QoS flow even if the source and/or destination Layer-2 IDs are changed due to e.g. privacy support. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

Editor's note: It is FFS how to determine PC5 QoS Flow Identifiers, i.e. self-assigned or pre-configured.

5.6.1.4 Identifiers for Unicast Mode V2X Communication Over PC5 Reference Point

For unicast mode of V2X communication over PC5 reference point, the destination Layer-2 ID used depends on the communication peer, which is discovered during the establishment of the unicast link. The initial signalling for the establishment of the unicast link may use a default destination Layer-2 ID associated with the service type (e.g. PSID/ITS-AID) configured for unicast link establishment, as specified in clause 5.1.2.1. During the unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE needs to maintain a mapping between the Application Layer IDs and the source Layer-2 IDs used for the unicast links, as the V2X application layer does not use the Layer-2 IDs. This allows the change of source Layer-2 ID without interrupting the V2X applications.

When Application Layer IDs change, the source Layer-2 ID(s) of the unicast link(s) shall be changed if the link(s) was used for V2X communication with the changed Application Layer IDs.

A UE may establish multiple unicast links with a peer UE and use the same or different source Layer-2 IDs for these unicast links.

Editor's note: Further updates of the identifier description may be required based on RAN WG feedback.

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 14:
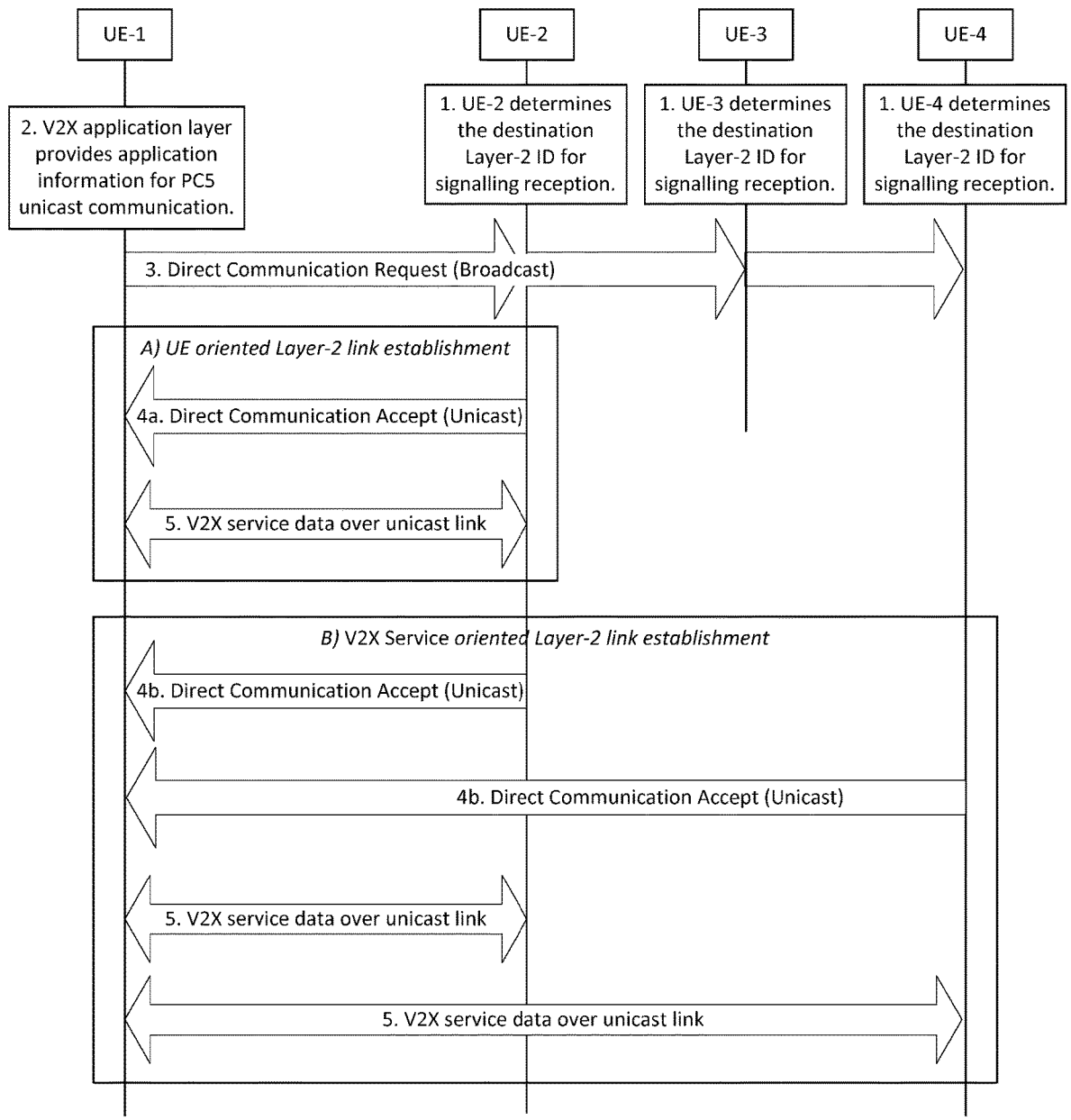
FIG. 14 is a reproduction of FIG. 6.3.3.1-1 of 3GPP TS 23.287 V0.4.0.

[FIG. 6.3.3.1-1 of 3GPP TS 23.287 V0.4.0, entitled "Layer-2 link establishment procedure", is reproduced as FIG. 14]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information.

The V2X application layer in UE-1 may provide service requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:
      Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Indication whether IP communication is used.

IP Address Configuration: For IP communication, IP address configuration is required for this link.

Editor's Note: Detail of IP Address Configuration is FFS.
      QoS Info: the information about PC5 QoS Flow(s). For each PC5 QoS Flow, the PFI and the corresponding PC5 QoS parameters (i.e. PQI and conditionally other parameters such as MFBR/GFBR, etc).

Editor's Note: It is FFS whether exchange of QoS Info is needed.

The source Layer-2 ID and destination Layer-2 ID used to send the Direct Communication Request message are determined as specified in clauses 5.6.1.1 and 5.6.1.4.

UE-1 sends the Direct Communication Request message via PC5 broadcast using the source Layer-2 ID and the destination Layer-2 ID.

4. A Direct Communication Accept message is sent to UE-1 as below:
   4a. (UE oriented Layer-2 link establishment) If the Target User Info is included in the Direct Communication Request message, the target UE, i.e. UE-2 responds with a Direct Communication Accept message.
   4b. (V2X Service oriented Layer-2 link establishment) If the Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in FIG. 6.3.3.1-1).

The Direct Communication Accept message includes:
Source User Info: Application Layer ID of the UE sending the Direct Communication Accept message.
QoS Info: the information about PC5 QoS Flow(s). For each PC5 QoS Flow, the PFI and the corresponding PC5 QoS parameters (i.e. PQ1 and conditionally other parameters such as MFBR/GFBR, etc).
The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.

Upon receiving the Direct Communication Accept message from peer UE, UE-1 obtains the peer UE's Layer-2 ID for future communication, for signalling and data traffic for this unicast link.

The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Editor's Note: Steps for mutual authentication and security association establishment will be determined based on feedback from SA WG3.

5. V2X service data is transmitted over the established unicast link as below:
   The PC5 Link Identifier and PFI are provided to the AS layer, together with the V2X service data.
   UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE: PC5 unicast link is bi-directional, therefore the peer UE of UE-1 can send the V2X service data to UE-1 over the unicast link with UE-1.

Editor's Note: The parameters included in the Direct Communication Request/Accept messages can be updated depending on RAN WGs' decision on how the Direct Communication Request/Accept messages are sent by the AS layer (e.g. by using PC5-RRC signalling).

Editor's Note: Additional parameters included in the Direct Communication Request/Accept messages (e.g. security related) are FFS.

Editor's Note: Whether the unicast communication requires security protection at link layer will be determined based on feedback from SA WG3.

6.3.3.2 Link Identifier Update for a Unicast Link

FIG. 6.3.3.2-1 shows the link identifier update procedure for a unicast link. Due to the privacy requirements, identifiers used for unicast mode of V2X communication over PC5 reference point (e.g. application layer identifier, Source Layer-2 ID and IP address/prefix) shall be changed over time as specified in clauses 5.6.1.1 and 5.6.1.4. This procedure is used to update the peer UE for a unicast link of the impending change of the identifiers used for this link before the identifier changes happen, to prevent service interruptions.

If a UE has multiple unicast links using the same application layer identifiers or Layer-2 IDs, the UE needs to perform the link identifier update procedure over each of the unicast link.

Figure 15:
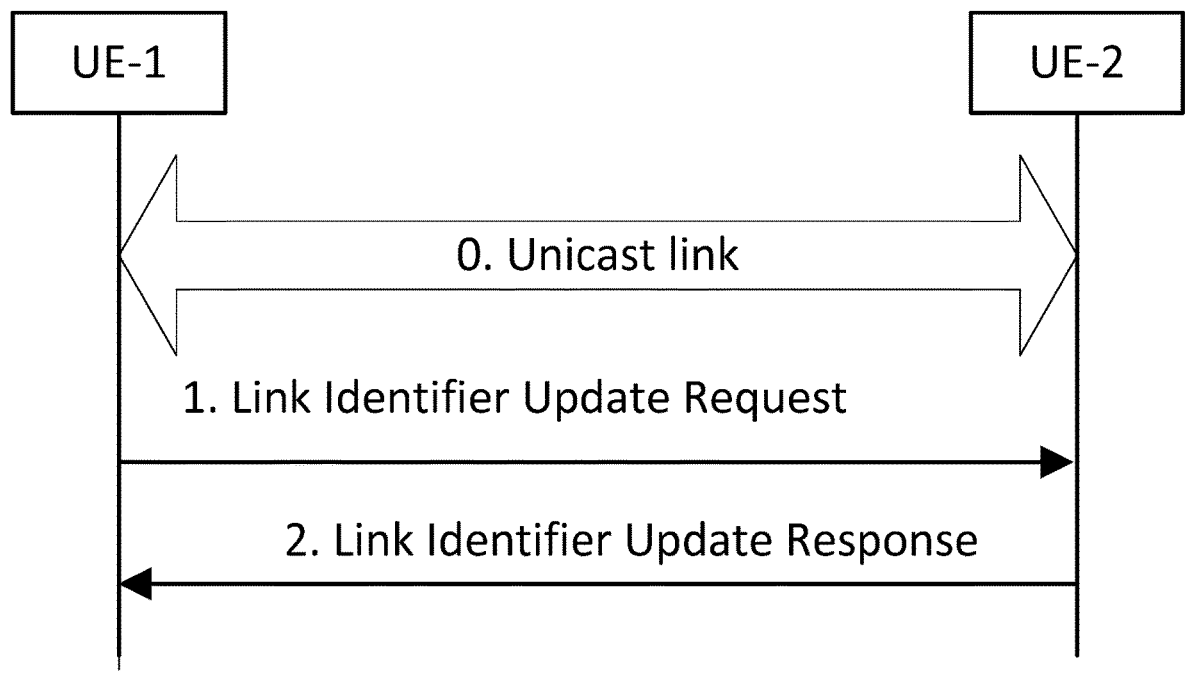
FIG. 15 is a reproduction of FIG. 6.3.3.2-13GPP TS 23.287 V0.4.0.

[FIG. 6.3.3.2-1 3GPP TS 23.287 V0.4.0, entitled "Link identifier update procedure", is reproduced as FIG. 15]

0. UE-1 and UE-2 have a unicast link established as described in clause 6.3.3.1.
1. UE-1 decides the change of identifiers, e.g. due to the application layer identifier change or upon expiry of a timer, and send a Link Identifier Update Request message to UE-2 before it changes the identifiers.
   The Link Identifier Update Request message includes the new identifiers to use (including the new application layer identifier, new Layer-2 ID, new IP address/prefix if IP communication is used). The new identifiers should be cyphered to protect privacy.

NOTE: The timer is running on per Source Layer-2 ID.

2. UE-2 responds with a Link Identifier Update Response message. Upon reception of the message, UE-1 and UE-2 start to use the new identifiers for the data traffic. UE-1 shall receive traffic on its old Layer-2 ID until it receives the Link Identifier Update Response message from UE-2.
   The V2X layer of each UE passes the PC5 Link Identifier for the unicast link and the updated Layer-2 ID (i.e. source Layer-2 ID for UE-1 while destination Layer-2 ID for UE-2) down to the AS layer. This enables the AS layer to update the provided Layer-2 ID for the unicast link.

As described in the 3GPP RAN2 #106 Chairman's note, 3GPP RAN2 #106 made following agreements:

---

Agreements on NR SL QoS and SLRB configurations:

1: Stick to SI phase conclusion that SLRB configurations should be NW-configured and/or pre-configured for NR SL.
2: For an RRC_CONNECTED UE, for transmission of a new PC5 QoS flow, it may report the QoS information of the PC5 QoS flow via RRC dedicated signalling to the gNB/ng-eNB. FFS on the exact timing about when UE initiates.

| Agreements on NR SL QoS and SLRB configurations: |
|---|
| 3: For an RRC_CONNECTED UE, the gNB/ng-eNB may provide SLRB configurations and configure the mapping of PC5 QoS flow to SLRB via RRC dedicated signalling, based on the QoS information reported by the UE. The UE can establishes/reconfigures the SLRB only after receiving the SLRB configuration. FFS when the UE establishes/reconfigures the SLRB.
4: FFS what the reported QoS information is (e.g. PFI, PC5 QoS profile, etc.) and what is used to realize the PC5 QoS flow to SLRB mapping (e.g. PFI to SLRB mapping, QoS profile to SLRB mapping, etc.), depending on SA2 conclusion on how PFI is assigned.
5: For RRC_IDLE/INACTIVE UEs, the gNB/ng-eNB may provide SLRB configurations and configure the PC5 QoS profile to SLRB mapping via V2X-specific SIB. When an RRC_IDLE/INACTIVE UE initiates the transmission of a new PC5 QoS flow, it establishes the SLRB associated with the PC5 QoS profile of that flow based on SIB configuration.
6: FFS how to describe each PC5 QoS profile in the SIB, pending SA2's final conclusion on what PC5 QoS parameters are included in a PC5 QoS profile.
7: For OoC UEs, SLRB configurations and the mapping of PC5 QoS profile to SLRB are pre-configured. When an OoC UE initiates the transmission of a new PC5 QoS flow, it establishes the SLRB associated with the flow based on pre-configuration.
8: FFS what is used to realize for PC5 QoS flow to SLRB mapping in pre-configuration (e.g. PFI to SLRB mapping, QoS profile to SLRB mapping, etc.), depending on SA2 conclusion on how PFI is assigned.
9: For SL unicast of a UE, the NW-configured/pre-configured SLRBs configurations include the SLRB parameters that are only related to TX, as well as the SLRB parameters that are related to both TX and RX and need to be aligned with the peer UEs.
10: For SL unicast, the initiating UE informs the peer UE of SLRB parameters that are related to both TX and RX and need to be aligned with the peer UEs. FFS on the detailed parameters.
11: For SL unicast, do not allow a UE to configure "SLRB parameters only related to TX" for the peer UE in SL via PC5 RRC message. FFS how to handle SRLB parameters only related to RX.
12: For SL groupcast and/or broadcast, the NW-configured/preconfigured SLRBs include the SLRB parameters that are only related to TX.
13: Those SLRB parameters which are related to both TX and RX and thus need to be aligned between a UE and all its peer UE(s) should be fixed in the Spec for SL groupcast and broadcast.
14: For SL broadcast, how to set SLRB parameters only related to RX is up to UE implementation. FFS for groupcast case.
15: SLRB configurations should be (pre-)configured for SL unicast, groupcast/broadcast separately (e.g. SLRB-ConfigForUnicast, SLRB-ConfigForGroupcast, SLRB-ConfigForBroadcast). FFS on the need of separate SLRB configurations between groupcast and broadcast. |

| Agreements on PC5-RRC: |
|---|
| 1: Need bi-directional procedure for capability transfer procedure for bi-directional SL traffic.
2: Working assumption: both bi-directional one-way procedure and two-way procedure for capability transfer are allowed. FFS on how to support in details.
3: Need bi-directional procedure for AS-layer configuration procedure for bi-directional SL traffic.
4: Apply the two-way procedure to bi-directional AS-layer configuration, but no need for figure in RRC specification correspondingly.
5: Need to handle failure case for AS-layer configuration. Explicit failure message is used as baseline. Timer-based solution is also needed on top of explicit failure message. |

According to 3GPP TS 23.287, a UE (UE1) transmits a AS-layer configuration to inform a peer UE (UE2) of SLRB parameters that are related to both transmission and reception and needed to be aligned with both UEs. More specifically, the SLRB parameters could be provided by a network node (e.g. a base station, gNB) in a NW-configured SLRB configuration. Besides, failure case needs to be handled for AS-layer configuration. How UE1 responds to detection of the failure case should be considered. There are two possible signalling flow charts of AS-layer configuration procedure taking failure case into account.

Figure 16:
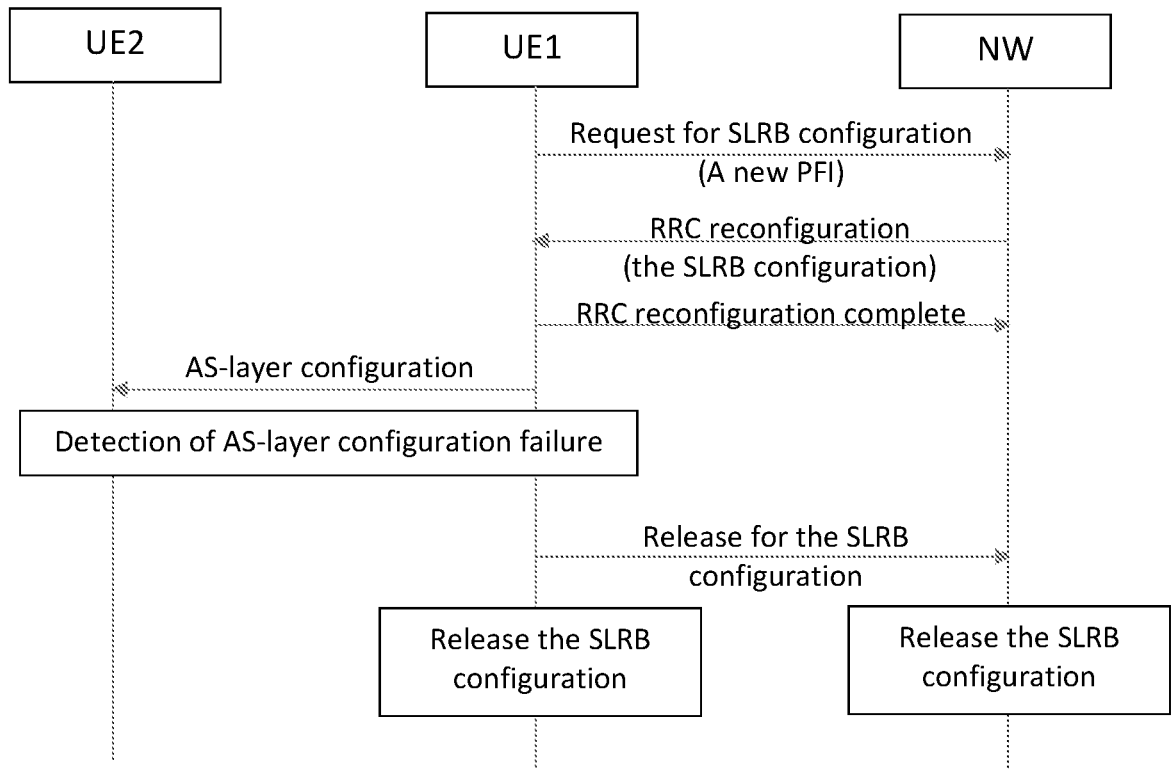
FIG. 16 is an exemplary flow chart for AS (Access Stratum)-layer configuration taking failure case in to account according to one exemplary embodiment.

One possibility could be illustrated in FIG. 16. FIG. 16 is an exemplary flow chart for AS-layer configuration taking failure case in to account according to one exemplary embodiment. As shown in FIG. 16, UE1 transmits a request for SLRB (Sidelink Radio Bearer) configuration to the network for requesting a SLRB configuration for a unicast link established with the UE2. In the request for SLRB configuration, one or more identities of QoS (Quality of Service) flows (e.g. PQIs, 5QIs or QFIs) used for the unicast link could be included. Possibly, the request for SLRB configuration could also include an identity used to identify the unicast link (e.g. PC5 Link Identifier). With the request for SLRB configuration, the network then transmits the SLRB configuration to UE1. In the SLRB configuration, SLRB parameters (e.g. PDCP (Packet Data Convergence Protocol) configuration, RLC (Radio Link Control) configuration, and/or logical channel configuration) that are related to both transmission and reception and needed to be aligned with UE1 and UE2 could be included. Possibly, the SLRB configuration could be included in a RRC (Radio Resource Control) reconfiguration message sent to UE1. With the RRC reconfiguration message, UE1 transmits a RRC reconfiguration complete message to the network. The RRC reconfiguration complete message could be used to indicate the network that UE1 accepts or is able to comply with the RRC reconfiguration message including the SLRB configuration.

UE1 transmits a PC5 RRC message including an AS (Access Stratum)-layer configuration to UE2. The AS-layer configuration could be derived from the SLRB configuration received from the network. In some case, it is possible that UE2 cannot comply with the AS-layer configuration due to, for example, AS capability issue. In this situation, UE2 could transmit a failure message corresponding to the PC5 RRC message including the AS-layer configuration to UE1. Alternatively, UE1 would consider the AS-layer configuration on the UE2 is not successful when a timer expires. UE1 may start the timer upon transmission of the PC5 RRC message including the AS-layer configuration. UE1 may stop the timer upon reception of another PC5 RRC message indicating acceptance of the AS-layer configuration from the UE2. With detection of failure on the AS-layer configuration based on the failure message or expiry of the timer, UE1 may need to transmit a RRC message to the network. Transmission of the RRC message could be triggered upon detection of the failure case. Possibly, the RRC message could be used to indicate the failure on the AS-layer configuration for the unicast link. Possibly, the RRC message could be used to indicate the network for releasing the SLRB configuration. Possibly, the RRC message could be used to indicate the network that UE2 cannot comply with the AS-layer configuration derived from the SLRB configuration provided by the network. The RRC message could be a release for SLRB configuration.

The RRC message used to indicate the failure on the AS-layer configuration or the release for SLRB configuration could include at least one of following:
  an identity of a unicast link, where the identity of the unicast link could be associated with the SLRB configuration; and/or
  one or more identities of QoS flows, where the one or more identities of QoS flow could be associated with the SLRB configuration.

Upon transmission of the RRC message used to indicate the failure on the AS-layer configuration or the release for the SLRB configuration to the network, UE1 releases the SLRB configuration. Similarly, the network releases the SLRB configuration upon reception of the RRC message used to indicate the failure on the AS-layer configuration or the release for the SLRB configuration.

Normally, the UE transmits a RRC message (e.g. SidelinkUEInformation) to notify the network (e.g. gNB) that it is no longer interested in sidelink communication with the peer UE if the unicast link established between both UEs is released or the V2X service associated with the unicast link is deactivated/disabled. In this RRC message (e.g. SidelinkUEInformation), a cause value indicating such as "unicast link release" or "sidelink service release" could be included.

In addition to informing the network of the configuration failure, the UE may need to release the unicast link with the peer UE or terminate the unicast link establishment procedure with the peer UE because it is useless to keep the unicast link without traffic exchange capability. Besides, the UE may also transmit a RRC message (e.g. SidelinkUEInformation) to notify the network (e.g. gNB) that it is no longer interested in sidelink communication with the peer UE. Thus, a more efficient way is for the UE to directly transmit the RRC message (e.g. SidelinkUEInformation) to inform the network (e.g. gNB) that it is no longer interested in sidelink communication with the peer UE and the RRC message also indicates the configuration failure when the configuration failure is detected by the UE.

The RRC message (e.g. SidelinkUEInformation) could include at least one of following:
  a cause value indicating such as "configuration failure on unicast link" or "unicast link failure";
  an identity of a unicast link, where the identity of the unicast link could be associated with the SLRB configuration; and/or
  one or more identities of QoS flows, where the one or more identities of QoS flow could be associated with the SLRB configuration.

Figure 17:
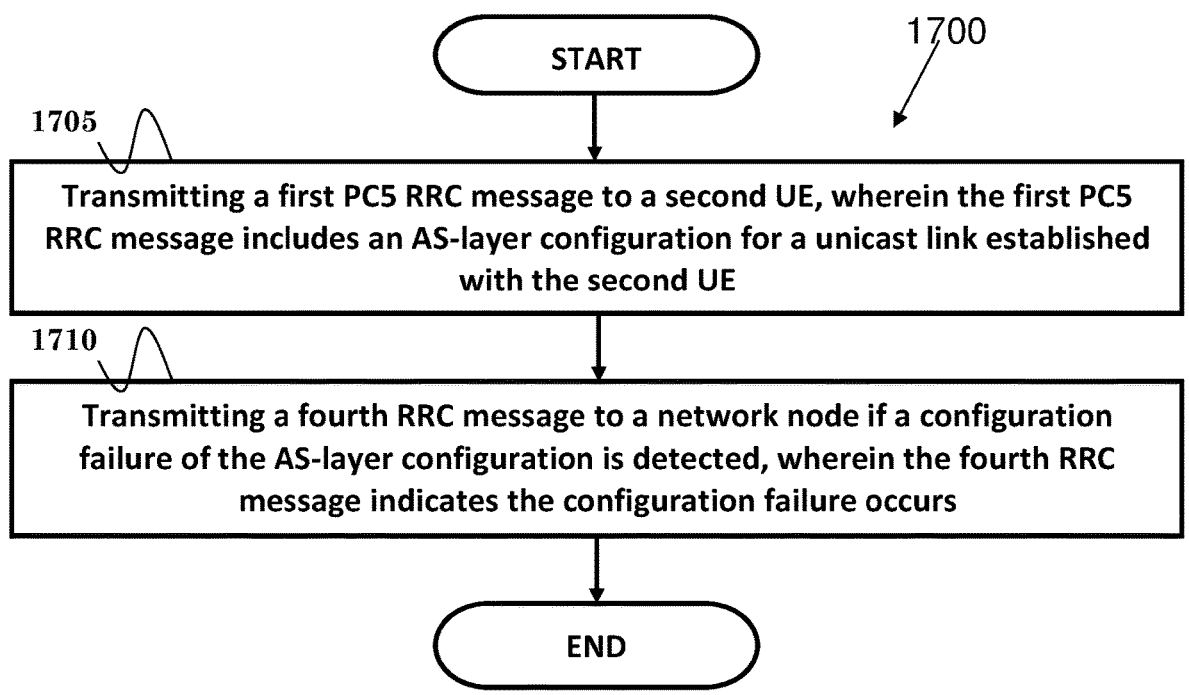
FIG. 17 is a flow chart according to one exemplary embodiment.

FIG. 17 is a flow chart 1700 according to one exemplary embodiment from the perspective of a first UE in RRC_CONNECTED for detecting configuration failure. In step 1705, the first UE transmits a first PC5 RRC message to a second UE, wherein the first PC5 RRC message includes an AS-layer configuration for the unicast link established with the second UE. In step 1710, the first UE transmits a fourth RRC message to a network node if a configuration failure of the AS-layer configuration is detected, wherein the fourth RRC message indicates the configuration failure occurs.

In one embodiment, the first UE could transmit a first RRC message to the network node, wherein the first RRC message includes a request for a SLRB configuration. The first UE could also receive a second RRC message from the network node, wherein the second RRC message includes the SLRB configuration. Furthermore, the first UE could transmit a third RRC message to the network node, wherein the third RRC message is a complete message in response to reception of the second RRC message. The first UE could also receive a second PC5 RRC message from the second UE, wherein the second PC5 RRC message indicates the second UE cannot comply with the AS-layer configuration or the AS-layer configuration is not acceptable to the second UE. The configuration failure could be detected based on reception of the second PC5 RRC message.

In one embodiment, the first UE may not receive a third PC5 RRC message from the second UE, wherein the third PC5 RRC message indicates the second UE complies with the AS-layer configuration for the unicast link successfully. The configuration failure could be detected based on expiry of a timer which is started when the first PC5 RRC message is transmitted.

In one embodiment, the first RRC message may include QoS parameters of a PC5 QoS flow (e.g. PQI PC5 5QI). The first RRC message may also include an identity of a PC5 QoS flow (e.g. PFI). Furthermore, the first RRC message may include a PC5 Link Identifier of the unicast link. The first RRC message could indicate an association between the PC5 Link Identifier and the PC5 QoS flow.

In one embodiment, the second RRC message or the SLRB configuration may include at least QoS flow to SLRB mapping, priority of a logical channel (LCH) of the SLRB, LCH to logical channel group (LCG) mapping, and/or RLC parameters. Furthermore, the second RRC message may indicate an association between the PC5 Link Identifier and the SLRB configuration.

In one embodiment, the third RRC message could be a RRC reconfiguration complete message.

In one embodiment, the network node could be a base station (e.g. gNB).

In one embodiment, the first UE could release the unicast link or terminate the unicast link establishment procedure in response to detection of the configuration failure. The first UE could also transmit a fifth RRC message to the network node after transmission of the fourth RRC message, wherein the fifth RRC message informs the network node that the first UE is no longer interested in sidelink communication with the second UE.

In one embodiment, the fourth RRC message may inform the network node that the first UE is no longer interested in sidelink communication with the second UE. The fourth RRC message could be a SidelinkUEInformation. The fourth RRC message may include a cause indicating the configuration failure or a unicast link failure.

In one embodiment, the fifth RRC message could be a SidelinkUEInformation.

Referring back to FIGS. 3 and 4, in one exemplary embodiment of a first UE. The first UE 300 includes a program code 312 stored in the memory 310. The CPU 308 could execute program code 312 to enable the first UE (i) to transmit a first PC5 RRC message to a second UE, wherein the first PC5 RRC message includes an AS-layer configuration for a unicast link established with the second UE, and (ii) to transmit a fourth RRC message to a network node if the configuration failure of the AS-layer configuration is detected, wherein the fourth RRC message indicates the configuration failure occurs. Furthermore, the CPU 308 can execute the program code 312 to perform all of the above-described actions and steps or others described herein.

Figure 18:
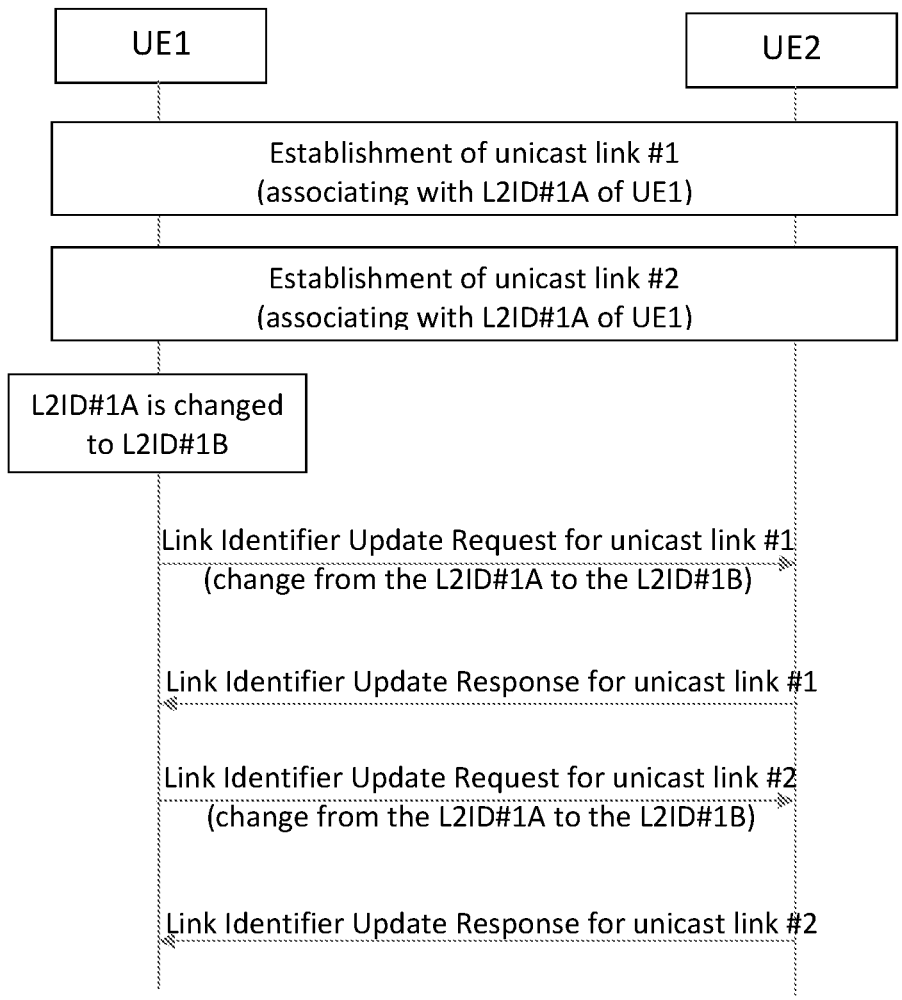
FIG. 18 is an exemplary flow chart of a link identifier update procedure based on 3GPP TS 23.287.
Figure 19:
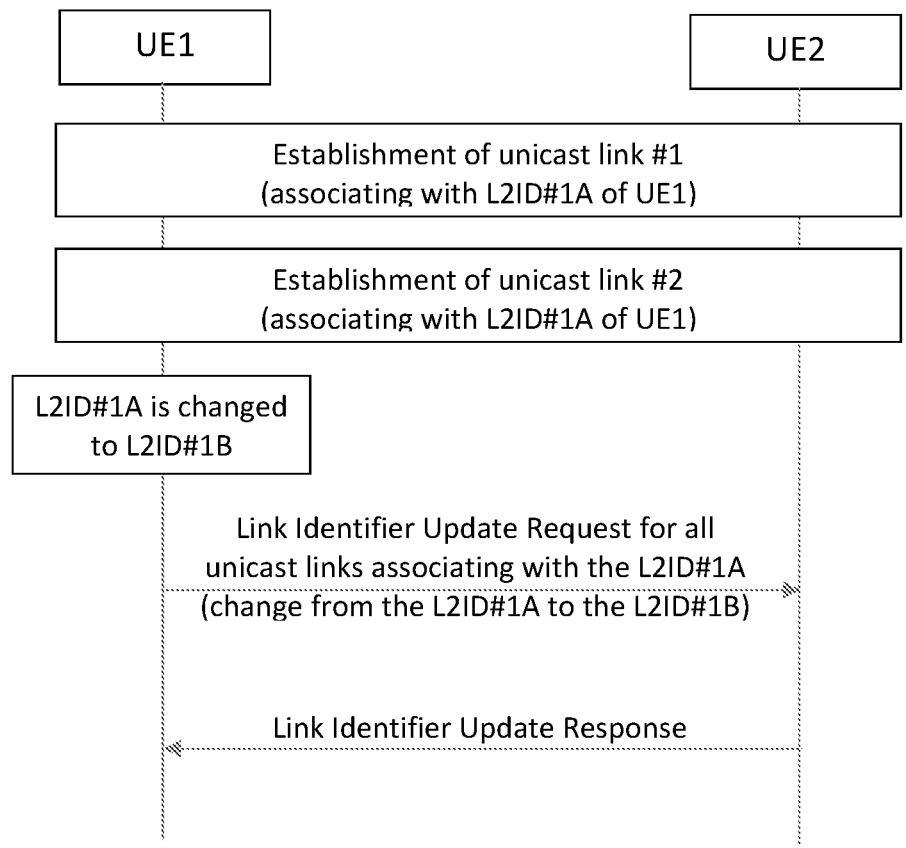
FIG. 19 is an exemplary flow chart for a link identifier update procedure according to one exemplary embodiment.

As discussed in 3GPP TS 23.287, the UE should perform the link identifier update procedure over each of the unicast link if a Source Layer-2 ID and/or an Application Layer ID of a UE used by multiple unicast links changes. It is fine if the UE establishes different unicast links with different peer UEs because different peer UEs use different Layer-2 IDs. In case the UE establishes multiple unicast links with the same peer UE and the same Layer-2 IDs of the UE is used for the multiple unicast links, the UE would perform the link identifier update procedure with the same peer UE multiple times just for changing one Layer-2 ID used over these unicast links, which is not efficient. This issue is illustrated in FIG. 18, which shows an exemplary flow chart of a link identifier update procedure based on 3GPP TS 23.287. FIG. 19 illustrates a solution, according to one exemplary embodiment, where the UE performs the link identifier update procedure only once with a peer UE for changing the same Layer-2 ID for the multiple unicast links with the peer UE.

Figure 20:
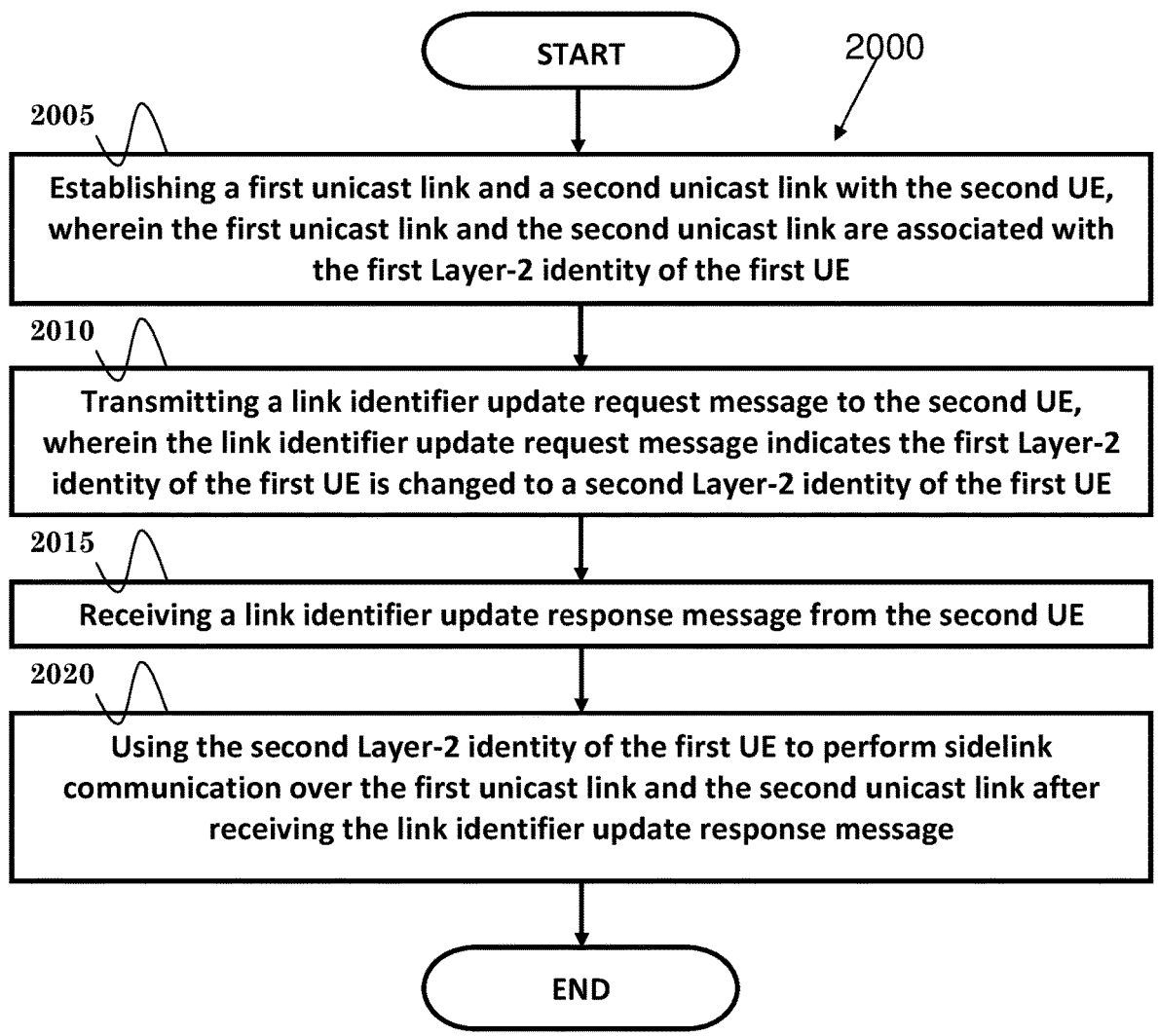
FIG. 20 is a flow chart according to one exemplary embodiment.

FIG. 20 is a flow chart 2000 according to one exemplary embodiment from the perspective of a first UE for changing a first Layer-2 identity of the first UE for multiple unicast links with a second UE. In step 2005, the first UE establishes a first unicast link and a second unicast link with the second UE, wherein the first unicast link and the second unicast link are associated with the first Layer-2 identity of the first UE. In step 2010, the first UE transmits a link identifier update request message to the second UE, wherein the link identifier update request message indicates the first Layer-2 identity of the first UE is changed to a second Layer-2 identity of the first UE. In step 2015, the first UE receives a link identifier update response message from the second UE. In step 2020, the first UE uses the second Layer-2 identity of the first UE to perform sidelink communication over the first unicast link and the second unicast link after receiving the link identifier update response message.

Referring back to FIGS. 3 and 4, in one exemplary embodiment of a first UE. The first UE 300 includes a program code 312 stored in the memory 310. The CPU 308 could execute program code 312 to enable the first UE (i) to establish a first unicast link and a second unicast link with the second UE, wherein the first unicast link and the second unicast link are associated with the first Layer-2 identity of the first UE, (ii) to transmit a link identifier update request message to the second UE, wherein the link identifier update request message indicates the first Layer-2 identity of the first UE is changed to a second Layer-2 identity of the first UE, (iii) to receive a link identifier update response message from the second UE, and (iv) to use the second Layer-2 identity of the first UE to perform sidelink communication over the first unicast link and the second unicast link after receiving the link identifier update response message. Furthermore, the CPU 308 can execute the program code 312 to perform all of the above-described actions and steps or others described herein.

Figure 21:
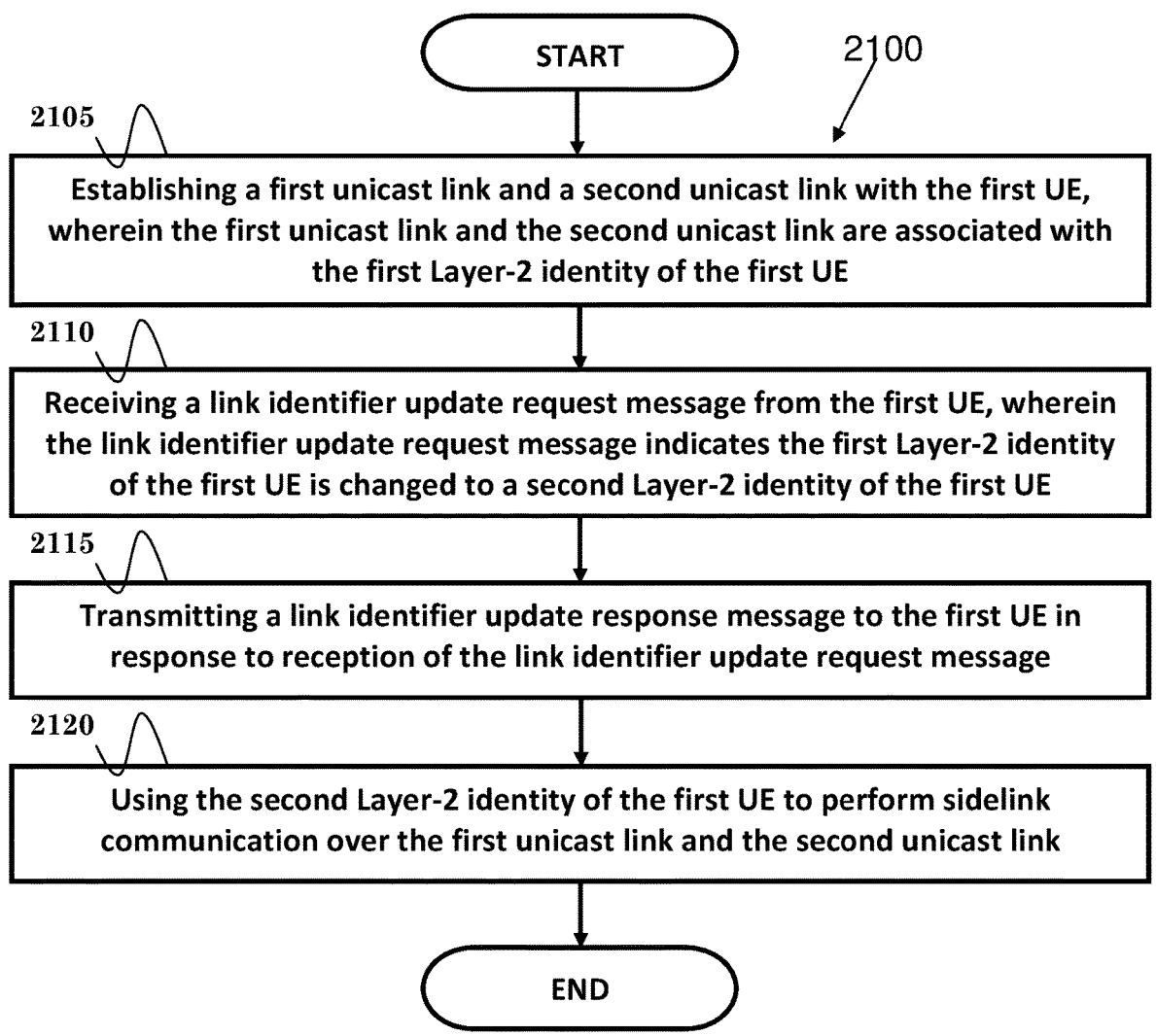
FIG. 21 is a flow chart according to one exemplary embodiment.

FIG. 21 is a flow chart 2100 according to one exemplary embodiment from the perspective of a second UE for changing a first Layer-2 identity of a first UE for multiple unicast links with the first UE. In step 2105, the second UE establishes a first unicast link and a second unicast link with the first UE, wherein the first unicast link and the second unicast link are associated with the first Layer-2 identity of the first UE. In step 2110, the second UE receives a link identifier update request message from the first UE, wherein the link identifier update request message indicates the first Layer-2 identity of the first UE is changed to a second Layer-2 identity of the first UE. In step 2115, the second UE transmits a link identifier update response message to the first UE in response to reception of the link identifier update request message. In step 2120, the second UE uses the second Layer-2 identity of the first UE to perform sidelink communication over the first unicast link and the second unicast link.

Referring back to FIGS. 3 and 4, in one exemplary embodiment of a second UE. The second UE 300 includes a program code 312 stored in the memory 310. The CPU 308 could execute program code 312 to enable the second UE (i) to establish a first unicast link and a second unicast link with the first UE, wherein the first unicast link and the second unicast link are associated with the first Layer-2 identity of the first UE, (ii) to receive a link identifier update request message from the first UE, wherein the link identifier update request message indicates the first Layer-2 identity of the first UE is changed to a second Layer-2 identity of the first UE, (iii) to transmit a link identifier update response message to the first UE in response to reception of the link identifier update request message, and (iv) to use the second Layer-2 identity of the first UE to perform sidelink communication over the first unicast link and the second unicast link. Furthermore, the CPU 308 can execute the program code 312 to perform all of the above-described actions and steps or others described herein.

In the context of the embodiments illustrated in FIGS. 20 and 21 and discussed above, in one embodiment, the link identifier update request message may include the second Layer-2 identity of the first UE. The link identifier update request message may also include the first Layer-2 identity of the first UE. Alternatively, the link identifier update request message may not include the first Layer-2 identity of the first UE.

In one embodiment, the second UE may understand the first Layer-2 identity of the first UE is changed to the second Layer-2 identity of the first UE since the link identifier update request message including the second Layer-2 identity of the first UE is received based on the first Layer-2 identity of the first UE. Also, the second UE may replace the first Layer-2 identity of the first UE with the second Layer-2 identity of the first UE for all unicast links (the first unicast link and the second unicast link) associated with the first Layer-2 identity of the first UE. Furthermore, the second UE may use one or more Layer-2 identities of the second UE for the first unicast link and the second unicast link.

In one embodiment, the link identifier update request message could be received based on any one of the one or more Layer-2 identities of the second UE. The first unicast link could be associated with a first PC5 Link Identifier, and the second unicast link is associated with a second PC5 Link Identifier.

In one embodiment, each PC5 Link Identifier may be different from any Layer-2 identity of the first UE or any Layer-2 identity of the second UE used to communicate between the first UE and the second UE. The first PC5 Link Identifier may be used to identify a first PC5 Unicast Link Profile, and the first PC5 Unicast Link Profile includes the first or second Layer-2 identity of the first UE and one of the one or more Layer-2 identities of the second UE used to communicate between the first UE and the second UE. The second PC5 Link Identifier may also be used to identify a second PC5 Unicast Link Profile, and the second PC5 Unicast Link Profile includes the first or second Layer-2 identity of the first UE and one of the one or more Layer-2 identities of the second UE used to communicate between the first UE and the second UE.

In one embodiment, the first PC5 Link Profile could include an application layer identity of the first UE and an application layer identity of the second UE for the first unicast link. The second PC5 Link Profile could include an application layer identity of the first UE and an application layer identity of the second UE for the second unicast link. Furthermore, the first or second PC5 Link Profile could include one or more than one service identity (e.g. PSID or ITS-AID) and/or one or more than one PC5 QoS Flow Identifier(s) (PFI(s) or QFI(s)).

In one embodiment, the first UE or the second UE could transmit a first RRC message to a network node to inform the network node that the first or second UE is interested in a sidelink transmission and/or a sidelink reception over the first or second unicast link, wherein the first RRC message includes the first or second PC5 Link Identifier. Furthermore, the first UE or the second UE could transmit a second RRC message to a network node for requesting a SLRB configuration for a PC5 QoS flow for the first or second unicast link, wherein the second RRC message includes the first or second PC5 Link Identifier and indicates association between the SLRB configuration and the first or second PC5 Link Identifier.

In one embodiment, the first UE or the second UE could receive a third RRC message from a network node, wherein the third RRC message includes the SLRB configuration. The third RRC message may indicate an association between the SLRB configuration and the first or second PC5 Link Identifier. The SLRB configuration may include at least QoS flow to SLRB mapping, priority of a logical channel (LCH) of the SLRB, LCH to logical channel group (LCG) mapping, and/or RLC parameters.

In one embodiment, the first UE or the second UE could receive a first PC5 message or a first sidelink data packet from the second UE, wherein the first or second PC5 Link Identifier is included in the first PC5 message or the first sidelink data packet to indicate the first or second unicast link associated with information in the first PC5 message or the first sidelink data packet. Furthermore, the first UE or the second UE could transmit a second PC5 message or a second sidelink data packet to the second UE, wherein the first or second PC5 Link Identifier is included in the second PC5 message or the second sidelink data packet to indicate the first or second unicast link associated with information in the second PC5 message or the second sidelink data packet.

In one embodiment, the first PC5 message or the first sidelink data packet could be received with one of the one or more Layer-2 identities of the second UE as a source Layer-2 identity and the first or second Layer-2 identity of first UE as a destination Layer-2 identity. The second PC5 message or the second sidelink data packet could be transmitted with the first or second Layer-2 identity of the first UE as a source Layer-2 identity and one of the one or more Layer-2 identities of second UE as a destination Layer-2 identity. The network node could be a base station (e.g. gNB).

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first UE (User Equipment) in RRC (Radio Resource Control)_CONNECTED to detect configuration failure, comprising:
transmitting a first PC5-S message to establish a unicast link with a second UE;
receiving a second PC5-S message from the second UE to complete establishment of the unicast link;
transmitting a first PC5 RRC message to the second UE, wherein the first PC5 RRC message includes an AS (Access Stratum)-layer configuration for the unicast link;
receiving a second PC5 RRC failure message directly from the second UE to indicate the second UE cannot comply with the AS-layer configuration; and
transmitting a RRC message, which is used to indicate a configuration failure, to a network node in response to reception of the second PC5 RRC failure message, wherein the RRC message includes a specific failure cause value.

2. The method of claim 1, further comprising:
transmitting a first RRC message to the network node, wherein the first RRC message includes a request for a SLRB (Sidelink Radio Bearer) configuration.

3. The method of claim 2, further comprising:
receiving a second RRC message from the network node, wherein the second RRC message includes the SLRB configuration.

4. The method of claim 3, further comprising:
transmitting a third RRC message to the network node, wherein the third RRC message is a complete message in response to reception of the second RRC message.

5. The method of claim 1, wherein the specific failure cause value, includes a cause value indicating a unicast link failure.

6. The method of claim 1, wherein the network node is a base station.

7. The method of claim 1, wherein the first PC5-S message is a Direct Communication Request message.

8. The method of claim 1, wherein the second PC5-S message is a Direct Communication Accept message.

9. A first UE (User Equipment), comprising:
a processor; and
a memory operatively coupled to the processor, wherein the processor is configured to execute a program code to:
transmit a first PC5-S message to establish a unicast link with a second UE;
receive a second PC5-S message from the second UE to complete establishment of the unicast link;
transmit a first PC5 RRC (Radio Resource Control) message to the second UE, wherein the first PC5 RRC message includes an AS (Access Stratum)-layer configuration for the unicast link;
receive a second PC5 RRC failure message directly from the second UE to indicate the second UE cannot comply with the AS-layer configuration; and
transmit a RRC message, which is used to indicate a configuration failure, to a network node in response to reception of the second PC5 RRC failure message, wherein the RRC message includes a specific failure cause value.

10. The first UE of claim 9, wherein the processor is further configured to execute a program code to:
transmit a first RRC message to the network node, wherein the first RRC message includes a request for a SLRB (Sidelink Radio Bearer) configuration.

11. The first UE of claim 10, wherein the processor is further configured to execute a program code to:
receive a second RRC message from the network node, wherein the second RRC message includes the SLRB configuration.

12. The first UE of claim 11, wherein the processor is further configured to execute a program code to:
   transmit a third RRC message to the network node, wherein the third RRC message is a complete message in response to reception of the second RRC message.

13. The first UE of claim 9, wherein the specific failure cause value, includes a cause value indicating a unicast link failure.

14. The first UE of claim 9, wherein the network node is a base station.

15. The first UE of claim 9, wherein the first PC5-S message is a Direct Communication Request message.

16. The first UE of claim 9, wherein the second PC5-S message is a Direct Communication Accept message.

* * * * *